United States Patent
Allen, Jr.

(10) Patent No.: US 9,485,978 B1
(45) Date of Patent: Nov. 8, 2016

(54) PIVOTING FISHING ROD HOLDER FOR A KAYAK

(71) Applicant: Robert Allen, Jr., Pensacola, FL (US)

(72) Inventor: Robert Allen, Jr., Pensacola, FL (US)

(*) Notice: Subject to any disclaimer, the term of this patent is extended or adjusted under 35 U.S.C. 154(b) by 182 days.

(21) Appl. No.: 14/336,648

(22) Filed: Jul. 21, 2014

(51) Int. Cl.
*A01K 97/10* (2006.01)
*F16M 13/02* (2006.01)

(52) U.S. Cl.
CPC ............ *A01K 97/10* (2013.01); *F16M 13/022* (2013.01)

(58) Field of Classification Search
CPC ..... A01K 97/10; F16M 13/02; F16M 13/022
See application file for complete search history.

(56) References Cited

U.S. PATENT DOCUMENTS

| | | | | |
|---|---|---|---|---|
| 4,528,768 A * | 7/1985 | Anderson | A01K 97/10 | 248/514 |
| 4,597,215 A * | 7/1986 | Otremba | A01K 97/10 | 43/19.2 |
| 4,760,986 A * | 8/1988 | Harrison | B60P 7/08 | 248/231.61 |
| 5,131,179 A * | 7/1992 | McEwen | A01K 97/10 | 206/315.11 |
| 5,142,809 A * | 9/1992 | O'Brien | A01K 97/10 | 248/514 |
| 5,243,928 A * | 9/1993 | Brenaman | B63B 25/28 | 114/347 |
| 5,813,164 A * | 9/1998 | Liberto | A01K 97/10 | 43/21.2 |
| 5,904,281 A * | 5/1999 | Mooers | B60R 9/06 | 224/518 |
| 5,996,527 A * | 12/1999 | Ambrozic | A01K 97/10 | 114/347 |
| 6,289,627 B1 * | 9/2001 | Gibbs | A01K 97/10 | 43/21.2 |
| 6,405,985 B1 * | 6/2002 | Glebe | A01K 91/08 | 248/291.1 |
| 6,409,131 B1 * | 6/2002 | Bentley | A01K 97/10 | 248/219.4 |
| 6,498,859 B2 * | 12/2002 | Kuerti | H04R 3/002 | 381/361 |
| 6,530,170 B1 * | 3/2003 | Sweeney | A01K 97/10 | 211/70.8 |
| 6,645,025 B2 * | 11/2003 | Oathout | B63B 25/002 | 440/104 |
| 6,964,243 B1 * | 11/2005 | Thompson | B63B 35/71 | 114/347 |
| 7,232,099 B1 * | 6/2007 | Wilcox | B63B 25/002 | 248/228.1 |
| 7,334,534 B2 * | 2/2008 | Cameron | B63B 7/04 | 114/347 |
| 7,530,324 B2 * | 5/2009 | Salerno | A01K 97/10 | 114/364 |
| 7,744,046 B1 * | 6/2010 | Lundy | B60R 11/02 | 248/121 |
| 7,971,839 B2 * | 7/2011 | Upchurch | B63B 25/002 | 248/121 |
| 8,286,572 B1 * | 10/2012 | Picek | A01K 97/10 | 114/218 |
| 8,453,373 B2 * | 6/2013 | Gordon | A01K 97/10 | 248/534 |
| 2005/0102881 A1 * | 5/2005 | Legendziewicz | A01K 97/10 | 43/21.2 |
| 2006/0048441 A1 * | 3/2006 | Sharff | A01K 97/10 | 43/54.1 |
| 2007/0028504 A1 * | 2/2007 | Cameron | A01K 97/10 | 43/21.2 |

(Continued)

*Primary Examiner* — Christopher P Ellis
*Assistant Examiner* — Michael Wang
(74) *Attorney, Agent, or Firm* — Crossley & Stevenson Intellectual Property Law

(57) ABSTRACT

A pivoting fishing rod holder for a kayak having a structure pivotally holding a pair of existing fishing rods, the structure comprising, a pair of identical L-shaped mounts configured for spaced apart mounting to the existing kayak, a pair of identical upright members, pivotally affixed to the L-shaped mounts, a tubular rod holder affixed at an angle to a distal end of each upright member, the angle within a range of about 20-45 degrees upwardly from a horizontal, a pair of diametrically opposed rounded insets disposed within each holder outer end, and a horizontal crossbar connecting the distal ends.

3 Claims, 3 Drawing Sheets

(56) References Cited

U.S. PATENT DOCUMENTS

| | | | |
|---|---|---|---|
| 2007/0216154 A1* | 9/2007 | Casagrande | A01K 97/06 283/61 |
| 2012/0017487 A1* | 1/2012 | O'Keefe | A01K 97/10 43/21.2 |
| 2013/0019515 A1* | 1/2013 | Holzer | A01K 97/10 43/21.2 |
| 2013/0326929 A1* | 12/2013 | Davis | A01K 97/10 43/21.2 |
| 2014/0033600 A1* | 2/2014 | McCorkle | A01K 97/10 43/21.2 |
| 2014/0182188 A1* | 7/2014 | Brown | A01K 97/10 43/18.1 R |
| 2014/0202062 A1* | 7/2014 | Rogers | A01K 97/10 43/21.2 |
| 2014/0360086 A1* | 12/2014 | Finlan | A01K 97/10 43/21.2 |
| 2015/0059230 A1* | 3/2015 | Ennis et al. | A01K 97/10 43/4.5 |
| 2015/0059637 A1* | 3/2015 | Johns | B63B 35/71 114/363 |
| 2015/0230447 A1* | 8/2015 | Keossian | A01K 97/10 43/17 |
| 2015/0327526 A1* | 11/2015 | Cooper | A01K 87/06 43/21.2 |
| 2015/0366180 A1* | 12/2015 | Chmura | A01K 97/10 248/514 |

* cited by examiner

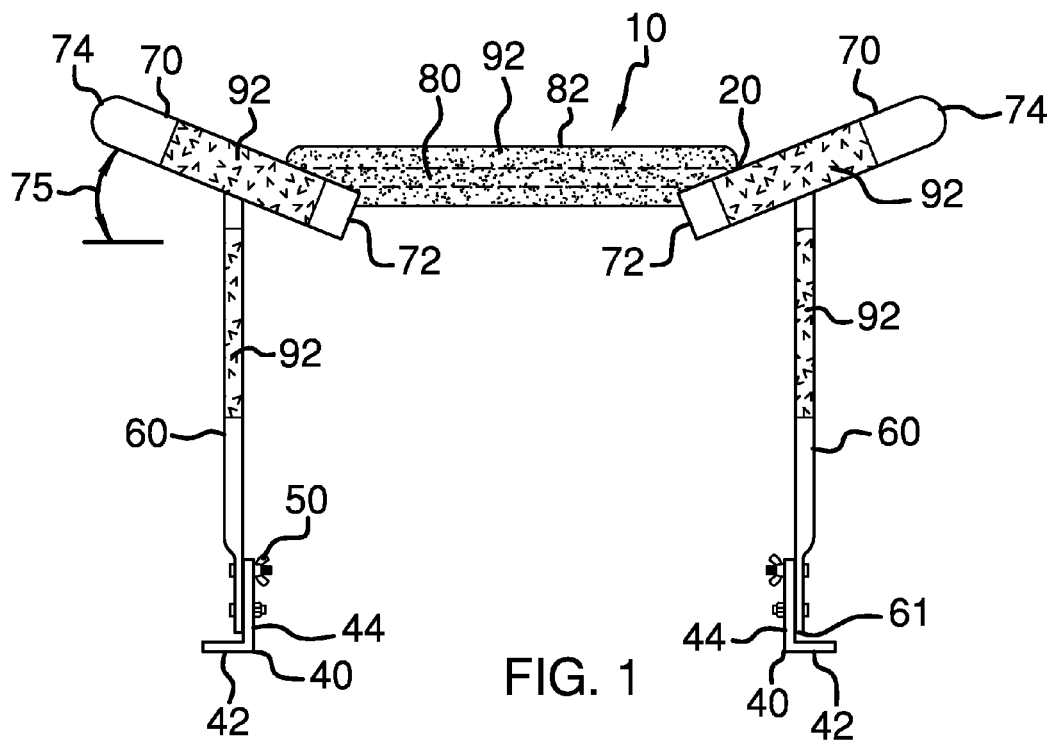
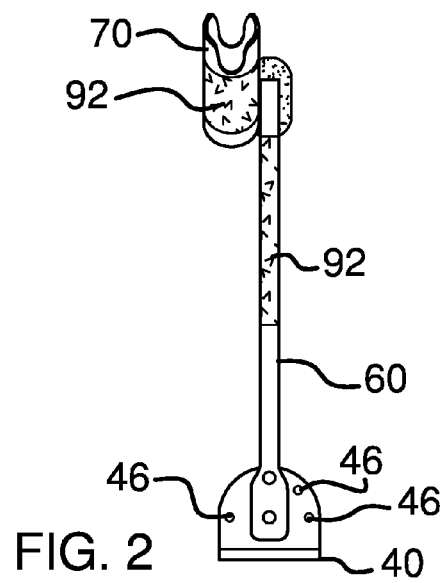
FIG. 1
FIG. 2

PIVOTING FISHING ROD HOLDER FOR A KAYAK

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of fishing rod holders are known in the prior art. Virtually all such apparatuses are designed to fit rigid gunwales on fishing boats, row boats and virtually any form of wood, steel, fiberglass, and even composite derived watercraft. There exist a few apparatuses for only carrying fishing rods on kayaks yet these do not provide what is needed in order for a kayak fisherman to correctly function, in kayak navigation coupled with successful fishing. Should a positionally permanent rod holder be incorporated in the kayak, transport, navigation, and other uninterrupted movement of the kayak proves excessively difficult. Also, rod positioning, when more than one fishing rod is used, is critical to avoid line entanglement. If fishing rods are located in an upright position line entanglement is virtually guaranteed.

What is needed is a pivoting fishing rod holder for a kayaks that provides for out-of-the-way positioning when not in use and also is designed to prevent line entanglement when more than one fishing rod is employed during use.

FIELD OF THE INVENTION

The present invention relates to fishing rod holders, and more particularly, to a pivoting fishing rod holder for a kayak.

SUMMARY OF THE INVENTION

The general purpose of the present pivoting fishing rod holder for a kayak, described subsequently in greater detail, is to provide a pivoting fishing rod holder for a kayak that has many novel features that result in a pivoting fishing rod holder for a kayak which is not anticipated, rendered obvious, suggested, or even implied by prior art, either alone or in combination thereof.

To accomplish this, the pivoting fishing rod holder for a kayak comprises a structure pivotally and selectively holding a pair of existing fishing rods. A pair of identical L-shaped mounts is provided. Each L-shaped mount comprises a base seamlessly joined to a semicircular disc at a right angle. The bases are configured for spaced apart L-shaped mount to the existing kayak. Mounting is not required to be but is typically configured on an either side of and directly behind an existing kayak seat. A plurality of spaced apart orifices is disposed in the semicircular disc.

A pair of identical upright members is provided. Each upright member has a proximal end spaced apart from a distal end. A pair of spaced apart holes is disposed in the proximal end. The holes comprise a first hole and a second hole most proximal the proximal end. Each second hole is pivotally and centrally affixed to one of each semicircular plate via a removable fastener, respectively, wherein one of each upright is configured to variably affix to a respective one of each L-shaped mount. A tubular rod holder is affixed at an angle to each distal end, respectively, the upright members therein selectively positioned in a horizontal plane and a vertical plane and positions there between. Each tubular rod holder has an inner end spaced apart from an outer end. The angle is not restricted to but is most often configured within a range of about 20-45 degrees upwardly of the outer end from the horizontal plane. A pair of diametrically disposed rounded insets is disposed within each outer end to best accommodate the existing fishing rods.

A crossbar connects the distal ends, the crossbar in the horizontal plane. A pad is selectively disposed on the crossbar. A bracket is affixed to the crossbar. A rod is pivotally affixed to the bracket. An accessory is affixed to the rod. The accessory may include but is not limited to a light, a clamp, and a tool. A reflective material is disposed on the pad, the tubular rod holders, and the upright members, predominantly for safety with regard to other existing watercraft.

Thus has been broadly outlined the more important features of the present pivoting fishing rod holder for a kayak so that the detailed description thereof that follows may be better understood and in order that the present contribution to the art may be better appreciated.

BRIEF DESCRIPTION OF THE DRAWINGS

Figures

FIG. 1 is a front elevation view.
FIG. 2 is a side elevation view.

DETAILED DESCRIPTION OF THE DRAWINGS

Figure 3:
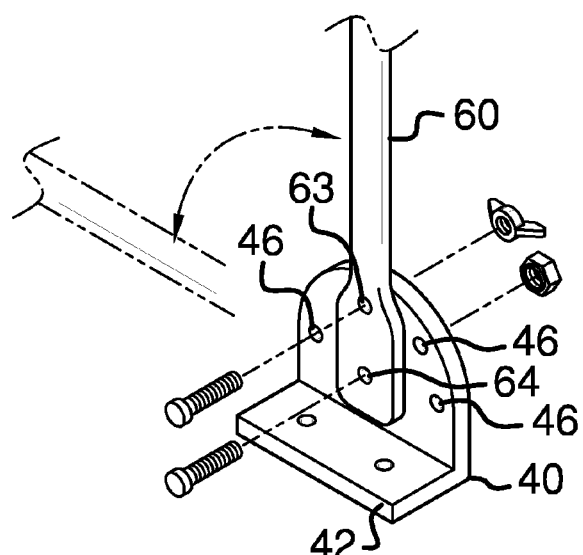
FIG. 3 is a perspective view of an L-shaped mount with an upright member.
Figure 4:
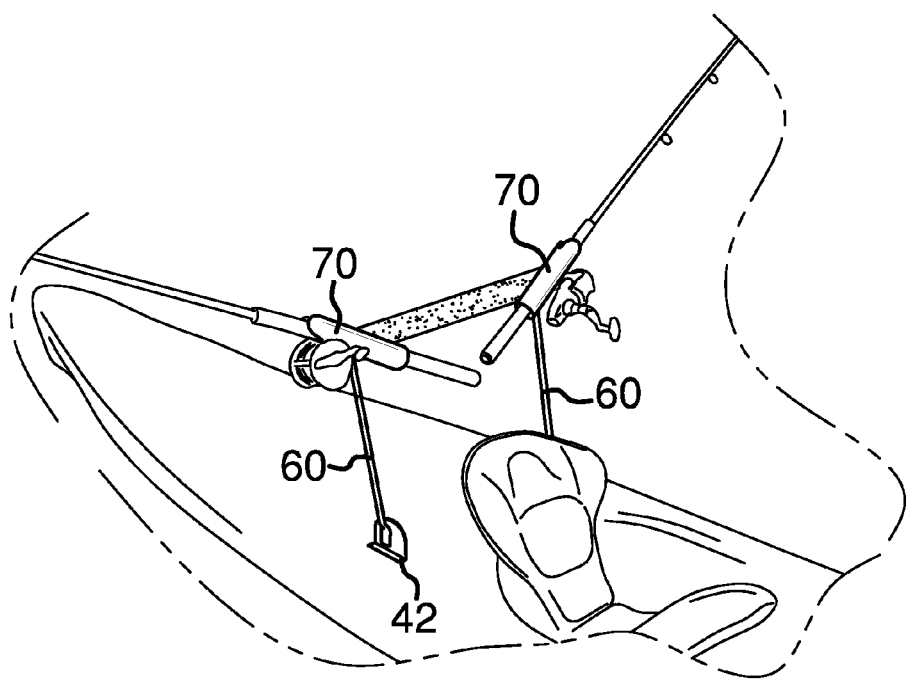
FIG. 4 is an in use elevation in use view.
Figure 5:
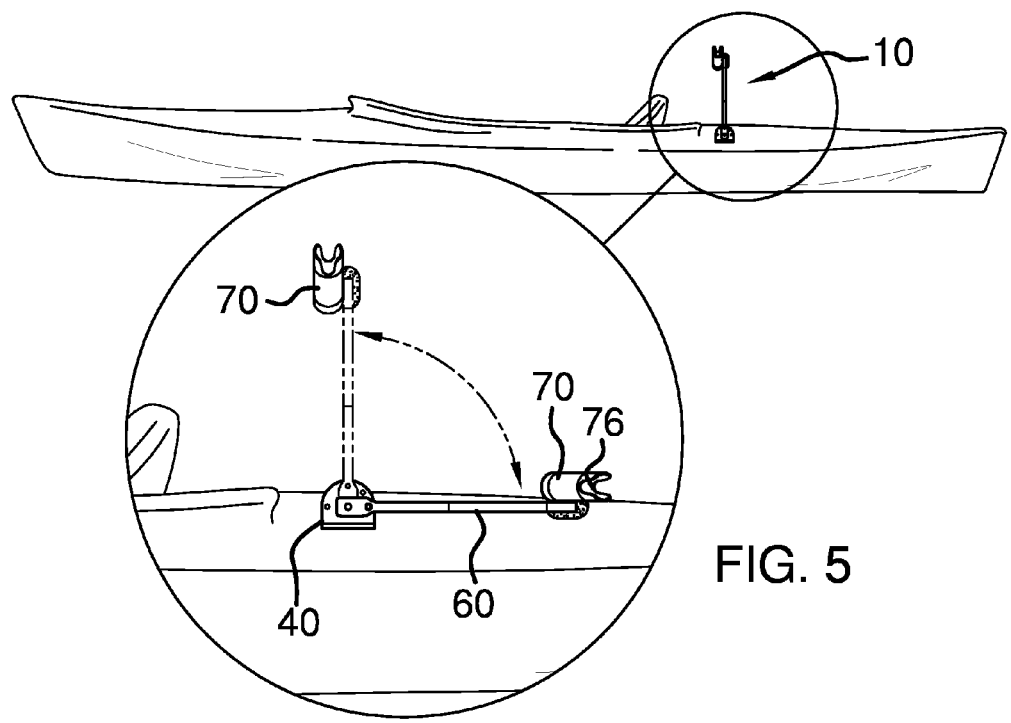
FIG. 5 is lateral elevation in use view.
Figure 6:
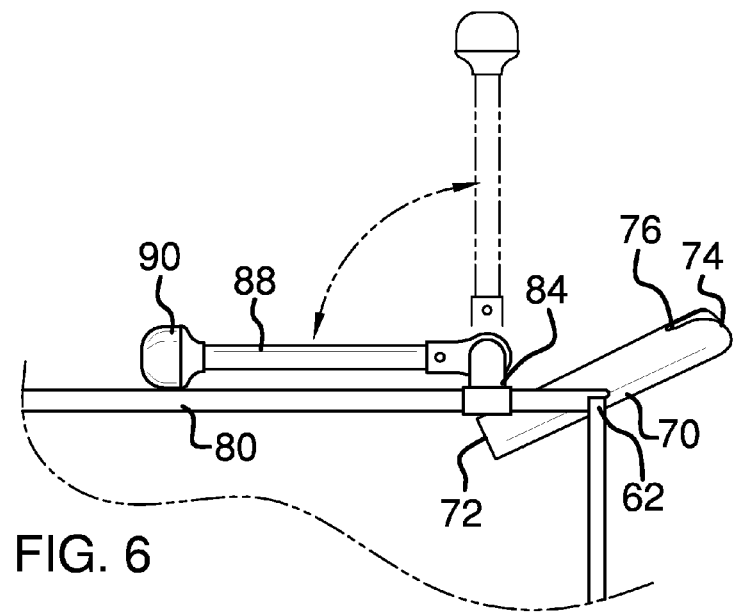
FIG. 6 is a detail view.

With reference now to the drawings, and in particular FIGS. 1 through 6 thereof, an example of the pivoting fishing rod holder for a kayak employing the principles and concepts of the present pivoting fishing rod holder for a kayak and generally designated by the reference number 10 will be described.

Referring to FIGS. 1 through 6, the pivoting fishing rod holder for a kayak 10 is illustrated. The pivoting fishing rod holder for a kayak 10 comprises a structure 20 pivotally holding a pair of existing fishing rods. A pair of identical L-shaped mounts 40 is provided. Each L-shaped mount 40 comprises a base 42 seamlessly joined to a semicircular disc 44 at a right angle. The bases 42 are configured for spaced apart L-shaped mount 40 anchoring to the existing kayak. Anchoring is typically configured on an either side of and directly behind an existing kayak seat. A plurality of spaced apart orifices 46 is disposed in the semicircular disc 44.

A pair of identical upright members 60 is provided. Each upright member 60 has a proximal end 61 spaced apart from a distal end 62. A pair of spaced apart holes is disposed in the proximal end 61. The holes comprise a first hole 63 and a second hole 64 most proximal the proximal end 61. Each second hole 64 is pivotally and centrally affixed to one of each semicircular plate 44 via a removable fastener 50, respectively, wherein one of each upright member 60 is configured to variably affix to a respective one of each L-shaped mount 40. A tubular linear rod holder 70 is affixed at an angle 75 to each distal end 62, respectively. Each tubular rod holder 70 has an inner end 72 spaced apart from an outer end 74. The angle 75 is within a range of about 20-45 degrees upwardly of the outer end 74 from a horizontal. A pair of diametrically disposed rounded insets 76 is disposed within each outer end 74.

A crossbar 80 connects the distal ends 62, the crossbar 80 in the horizontal. A single pad 82 is selectively and continuously disposed on substantially an entirety of the crossbar 80. A bracket 84 is affixed to the crossbar 80. A rod 88 is pivotally affixed to the bracket 84. An accessory 90 is affixed to the rod 88. The accessory 90 may include but is not limited to a light, a clamp, and a tool. A reflective material 92 is disposed on the pad 82, the tubular rod holders 70, and the upright members 60, predominantly for safety with regard to other existing watercraft.

What is claimed is:

1. A pivoting fishing rod holder for a kayak comprising:
  a structure pivotally holding a pair of existing fishing rods, the structure comprising:
    a pair of identical L-shaped mounts configured for spaced apart mounting to the existing kayak,
    a pair of identical upright members, each upright member having a proximal end spaced apart from a distal end, one of each proximal end pivotally affixed to a respective one of the L-shaped mounts;
    a pair of spaced apart holes disposed in the proximal end, the holes comprising a first hole and a second hole most proximal the proximal end, each second hole pivotally and centrally affixed to a semicircular plate, respectively;
    a pair of tubular linear rod holders, one of each tubular rod holder affixed at an angle to each distal end, respectively, each tubular rod holder having an inner end spaced apart from an outer end, the angle within a range of about 20-45 degrees upwardly of the outer end from a horizontal;
    a pair of diametrically disposed rounded insets disposed within each outer end;
    a crossbar connecting the distal ends, the crossbar in the horizontal;
    a single pad selectively and continuously disposed on substantially an entirety of the crossbar;
    a bracket affixed to the crossbar;
    a rod pivotally affixed to an accessory bracket; and
    an accessory affixed to the rod.

2. A pivoting fishing rod holder for a kayak comprising:
  a structure pivotally holding a pair of existing fishing rods, the structure comprising:
    a pair of identical L-shaped mounts, each L-shaped mount comprising a base seamlessly joined to a semicircular plate at a right angle, the bases configured for spaced apart L-shaped mount to the existing kayak;
    a plurality of spaced apart orifices disposed in the semicircular disc;
    a pair of identical upright members, each upright member having a proximal end spaced apart from a distal end;
    a pair of spaced apart holes disposed in the proximal end, the holes comprising a first hole and a second hole most proximal the proximal end, one of each second hole pivotally and centrally affixed to one of each semicircular plate, respectively;
    wherein one of each upright member is configured to variably affix to a respective one of the L-shaped mounts;
    a pair of tubular linear rod holders, one tubular rod holder affixed at an angle to each distal end, respectively, each tubular rod holder having an inner end spaced apart from an outer end, the angle within a range of about 20-45 degrees upwardly of the outer end from a horizontal;
    a pair of diametrically opposed rounded insets disposed within each outer end;
    a crossbar connecting the distal ends, the crossbar in the horizontal; and
    a single pad selectively and continuously disposed on substantially an entirety of the crossbar.

3. A pivoting fishing rod holder for a kayak comprising:
  a structure pivotally holding a pair of existing fishing rods, the structure comprising:
    a pair of identical L-shaped mounts, each L-shaped mount comprising a base seamlessly joined to a semicircular plate at a right angle, the bases configured for spaced apart L-shaped mount to the existing kayak;
    a plurality of spaced apart orifices disposed in the semicircular disc;
    a pair of identical upright members, each upright member having a proximal end spaced apart from a distal end;
    a pair of spaced apart holes disposed in the proximal end, the holes comprising a first hole and a second hole most proximal the proximal end, one of each second hole pivotally and centrally affixed to one of each semicircular plate, respectively;
    wherein a respective one of each upright member is configured to variably affix to a respective one of the L-shaped mounts;
    a pair of tubular linear rod holders, one tubular rod holder affixed at an angle to each distal end, respectively, each tubular rod holder having an inner end spaced apart from an outer end, the angle within a range of about 20-45 degrees upwardly of the outer end from a horizontal;
    a pair of diametrically opposed rounded insets disposed within each outer end;
    a crossbar connecting the distal ends, the crossbar in the horizontal;
    a single pad selectively and continuously disposed on substantially an entirety of the crossbar;
    a bracket affixed to the crossbar;
    a rod pivotally affixed to an accessory bracket;
    an accessory affixed to the rod; and
    a reflective material disposed on the pad, the tubular rod holders, and the upright members.

* * * * *